(12) United States Patent
Ikeuchi et al.

(10) Patent No.: US 12,437,379 B2
(45) Date of Patent: Oct. 7, 2025

(54) APPARATUS FOR INSPECTING APPEARANCE OF CAPSULE

(71) Applicant: QUALICAPS CO., LTD., Yamatokoriyama (JP)

(72) Inventors: Kyosuke Ikeuchi, Yamatokoriyama (JP); Naoki Yoshimoto, Yamatokoriyama (JP)

(73) Assignee: QUALICAPS CO., LTD.

( * ) Notice: Subject to any disclaimer, the term of this patent is extended or adjusted under 35 U.S.C. 154(b) by 368 days.

(21) Appl. No.: 17/797,079

(22) PCT Filed: Dec. 25, 2020

(86) PCT No.: PCT/JP2020/048657
§ 371 (c)(1),
(2) Date: Aug. 2, 2022

(87) PCT Pub. No.: WO2021/166446
PCT Pub. Date: Aug. 26, 2021

(65) Prior Publication Data
US 2023/0052070 A1 Feb. 16, 2023

(30) Foreign Application Priority Data
Feb. 17, 2020 (JP) .................. 2020-024121

(51) Int. Cl.
*G06T 7/00* (2017.01)
(52) U.S. Cl.
CPC ................. *G06T 7/0002* (2013.01)
(58) Field of Classification Search
CPC .................................. G06T 7/0002
See application file for complete search history.

(56) References Cited

U.S. PATENT DOCUMENTS

| 4,091,600 A | 5/1978 | Itoh |
| 6,108,030 A | 8/2000 | Yamamoto et al. |

(Continued)

FOREIGN PATENT DOCUMENTS

JP H10-288583 A 10/1998

OTHER PUBLICATIONS

English translation of the Notification of First Office Action of the corresponding CN application No. 202080096730.X mailed Oct. 19, 2024.

*Primary Examiner* — Kevin Ky
(74) *Attorney, Agent, or Firm* — Muncy, Geissler, Olds & Lowe, P.C.

(57) ABSTRACT

An apparatus for inspecting an appearance of capsule 40 in which cap 42 is fitted to body 41 includes a carrying body that carries capsule 40 housed in housing part 33, contact body 34 that rotates capsule 40 carried inside housing part 33 due to a contact friction, imaging device 17 that takes an image of the capsule rotating, and a determination device that determines if the capsule is good or poor based on an imaging data taken by imaging device 17. Wherein contact body 34 moves an inside of housing part 33 to a side of body 41 by rotating the capsule, which is housed in housing part 33 being separated from other capsules, around an axis direction, and the determination device determines an orientation of capsule 40 based on a position of capsule 40 in housing part 33.

8 Claims, 4 Drawing Sheets

(56) References Cited

U.S. PATENT DOCUMENTS

| | | | | |
|---|---|---|---|---|
| 8,622,196 | B1* | 1/2014 | Lapointe | B65B 65/08 |
| | | | | 198/383 |
| 2016/0287058 | A1* | 10/2016 | Ye | A61B 1/00158 |
| 2017/0219497 | A1* | 8/2017 | Shin | H04N 13/257 |
| 2018/0060669 | A1* | 3/2018 | Pham | G06T 7/80 |
| 2018/0215557 | A1* | 8/2018 | Archer | B65B 35/52 |
| 2018/0285634 | A1* | 10/2018 | Varadarajan | G06V 40/107 |
| 2019/0101412 | A1* | 4/2019 | Gouko | G01D 5/12 |
| 2019/0207823 | A1* | 7/2019 | Isci | H04L 41/5003 |
| 2023/0052070 | A1* | 2/2023 | Ikeuchi | B65G 47/84 |
| 2024/0148060 | A1* | 5/2024 | Blackmon | A24F 40/46 |

* cited by examiner

APPARATUS FOR INSPECTING APPEARANCE OF CAPSULE

TECHNOLOGY FIELD

The present invention relates to an apparatus for inspecting an appearance of capsules. More specifically, it relates to an apparatus that performs an appearance inspection of capsules with a cap and a body.

BACKGROUND

As an apparatus for inspecting an appearance of hard capsules including a cap and a body, an appearance inspection apparatus that is disclosed in Patent Document 1 is known, for example. As shown in FIG. 7, appearance inspection apparatus 50 includes inputting hopper 11, supply hopper 12, supply drum 13, first direction regulation drum 14, second direction regulation drum 15, inspection drum 16, and imaging device 17.

A capsule input into inputting hopper 11 is supplied from supply hopper 12 to supply drum 13. The capsule is carried in an upright state by supply drum 13 toward first direction regulating drum 14. First direction regulating drum 14 and second direction regulating drum 15 regulate the orientation of the capsule in order to cause one side of the capsule to be in a rollover state facing a certain direction, and then the capsule is supplied to inspection drum 16.

Inspection drum 16 includes inner cylinder 16a that is fixed and outer cylinder 16b that is rotatably attached to the outer side of inner cylinder 16a and is intermittently driven. A plurality of pockets 16c, which is configured by through holes, is formed in outer cylinder body 16b. Outer cylinder 16b carries the capsule housed in pocket 16c to an imaging position of imaging device 17 while holding the capsule using the outer peripheral surface of inner cylinder 16a. Inside inner cylinder 16a at the imaging position, rotation roller 16d that is exposed to the outside from inner cylinder 16a and comes into contact with the capsule is provided. When the capsule is carried to the imaging position, outer cylinder 16b temporarily stops. Then, the capsule rotates due to the rotation of rotation roller 16d. Imaging device 17 includes line sensor camera 17a and lighting device 17b. The imaging device uses line sensor camera 17a to take an image of the entire circumference of the capsule rotating with lighting device 17b. The captured image is determined to be good or poor by a determination part (not shown). Based on the determination result, a separation device (not shown) selectively collects a good item and a defective item.

PRIOR ART

Patent Document(s)

[Patent Doc. 1] JP Laid Open Patent Application Publication H10-288583

SUMMARY

Problems to be Solved by the Invention

The conventional appearance inspection apparatus requires first direction-regulating drum 14 and second direction-regulating drum 15 for aligning the directions of the capsules so that the good/poor determination of the capsule imaged by imaging device 17 can be correctly performed. Therefore, not only the configuration becomes complicated, but also there is room for improvement in terms of maintenance such as parts replacement and cleaning.

One object of the present invention is to provide a capsule appearance inspection apparatus that easily performs a capsule appearance inspection at low cost.

Means to Solve the Problem

The above objective of the present invention is achieved with an apparatus for inspecting an appearance of a capsule in which a cap is fitted to a body, comprising: a carrying body that carries the capsule housed in a housing part, a contact body that rotates the capsule carried inside the housing part due to a contact friction, an imaging device that takes an image of the capsule rotating, and a determination device that determines if the capsule is good or poor based on an imaging data taken by the imaging device, wherein the contact body moves an inside of the housing part to a body side by rotating the capsule, which is housed in the housing part being separated from other capsules, around an axis direction, and the determination device determines an orientation of the capsule based on a position of the capsule in the housing part.

With the capsule appearance inspection apparatus, the determination device determines the orientation of the capsule by comparing a center of the axis direction of the capsule contained in the imaging data with a center of an imaging area of the imaging device.

The contact body is a roller and an outer peripheral surface of the roller, which contacts the capsule is preferably formed smooth.

Advantage(s) of the Present Invention

According to the capsule appearance inspection apparatus of the present invention, the capsule appearance inspection is easily performed at low cost.

BRIEF DESCRIPTIONS OF THE DRAWINGS

EMBODIMENT(S) OF THE INVENTION(S)

Figure 1:
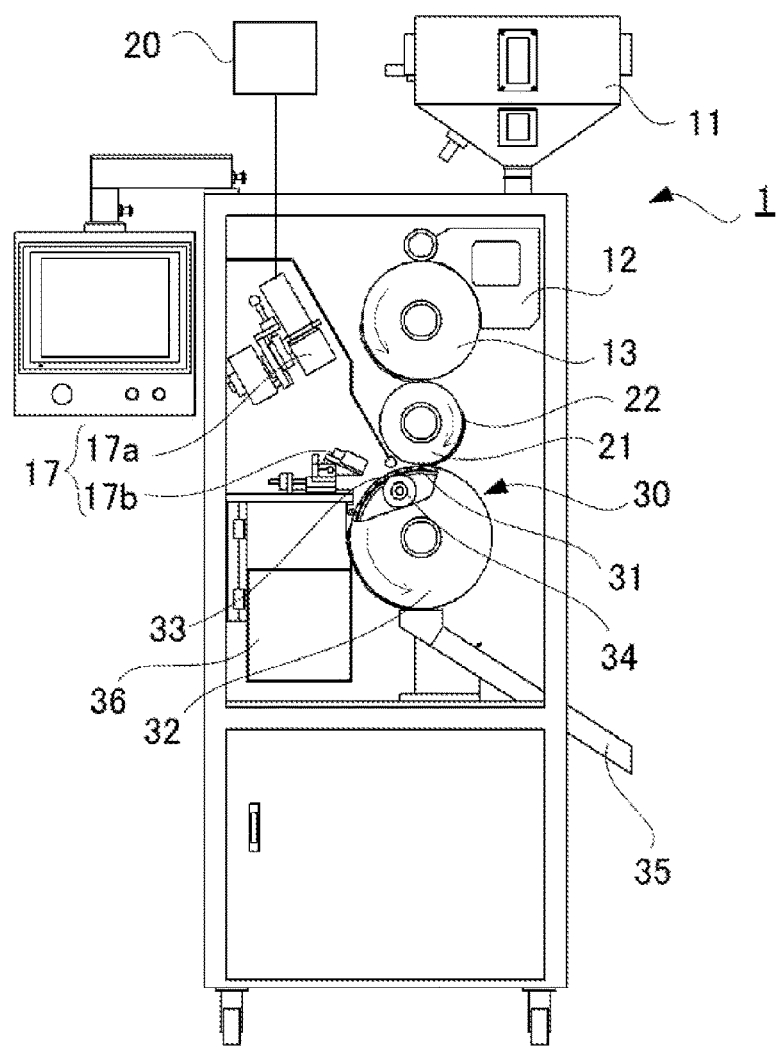
FIG. 1 is a schematic configuration view of a capsule appearance inspection apparatus according to one embodiment of the present invention.
Figure 7:
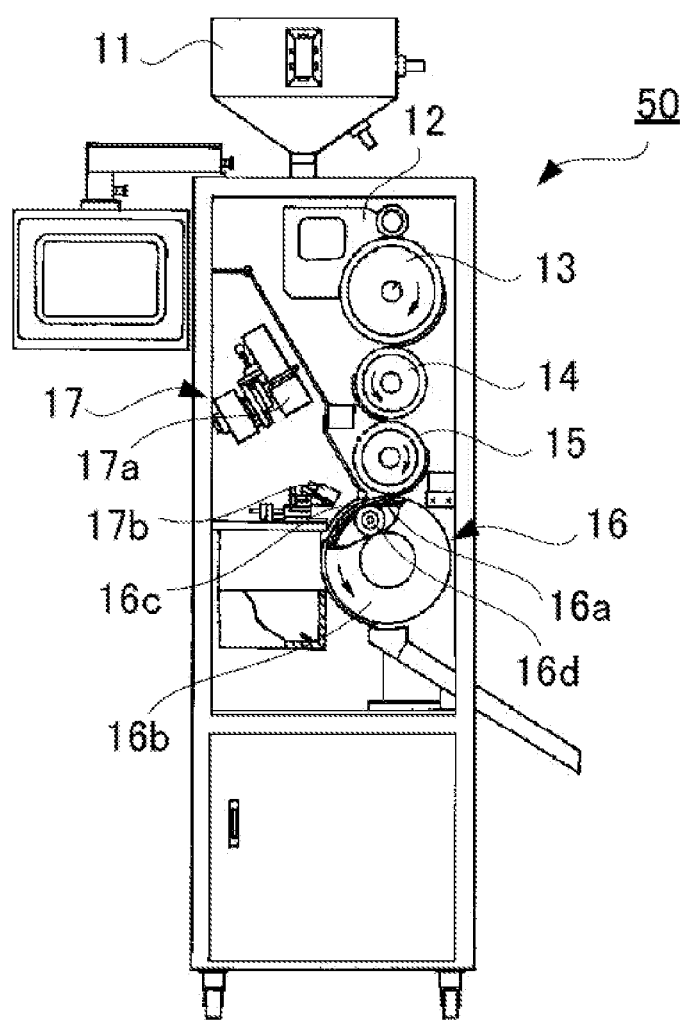
FIG. 7 is a schematic configuration view of a conventional capsule appearance inspection apparatus.

Hereinafter, embodiments of the present invention are explained with reference to the attached drawings. FIG. 1 is a schematic configuration view of a capsule appearance inspection apparatus (hereinafter, simply referred to as "appearance inspection apparatus") according to one embodiment of the present invention. Appearance inspection appearance 1 shown in FIG. 1 includes new delivery drum 21 instead of first direction control drum 14 and second direction control drum 15 that are provided in conventional appearance inspection apparatus 50 shown in FIG. 7. Further, instead of inspection drum 16 shown in FIG. 7, new inspection drum 30 is provided. Since the other configurations of appearance inspection apparatus 1 are the same as those of conventional appearance inspection device 50, the same reference numerals are given to the same components as conventional appearance inspection device 50 in appearance inspection apparatus 1 shown in FIG. 1. Detailed descriptions thereof are omitted, and the differences from conventional appearance inspection apparatus 50 are mainly explained. In the same fashion as conventional appearance inspection apparatus 50, appearance inspection apparatus 1 of the present embodiment is suitably used for inspecting hard capsules that contain powdery or liquid chemicals, foods, etc. by externally fitting caps to their bodies.

Figure 2:
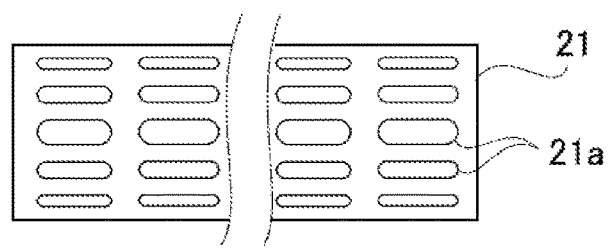
FIG. 2 is a main part side view of the apparatus shown in FIG. 1.

As shown in FIG. 2, delivery drum 21 is formed so that a plurality of housing pockets 21a are aligned in the axial direction and the circumferential direction of an outer peripheral surface. Each housing pocket 21a is formed horizontally extending so that the axial direction of the capsule to be housed (in other words, the direction in which the body and the cap engage) is arranged along the rotation axis direction of delivery drum 21. The capsule supplied from supply drum 13 is delivered sideways to a housing pocket of delivery drum 21 that rotates in the direction indicated by the arrow in FIG. 1. The capsule is then supplied to inspection drum 30. In the process of supplying the capsule from supply drum 13 to inspection drum 30 via delivery drum 21, compressed air may be supplied from the supply side of the capsule, and vacuum suction may be performed on the receive side of the capsule so that the capsule is smoothly delivered between the drums.

Delivery drum 21 does not need to align the directions of capsules as conventional first direction regulating drum 14 and second direction regulating drum 15 do. Accordingly, the configuration of delivery drum 21 only includes housing pocket 21a. In conventional appearance inspection apparatus 50, the configuration is simplified by replacing first direction regulating drum 14 and second direction regulating drum 15 with delivery drum 21. Such a configuration reduces manufacturing costs and facilitates maintenance operations.

By using a feeding device that is capable of supplying the capsule in a state of lying down, the capsule may be directly supplied from this feeding device to the inspection drum 30.

Figure 3:
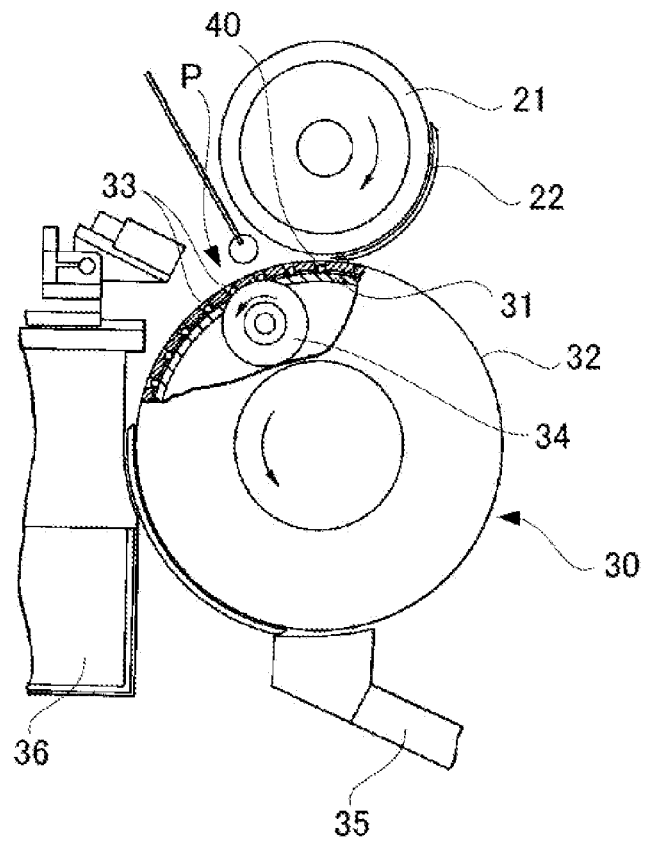
FIG. 3 is a main part enlarged view of the apparatus shown in FIG. 1.

FIG. 3 is an enlarged view of inspection drum 30 shown in FIG. 1. As shown in FIG. 3, inspection drum 30 is provided with fixed cylindrical inner cylinder 31 and cylindrical transport body 32 that is rotationally driven along the outer periphery of inner cylinder 31. Transport body 32 is provided with housing part 33 composed of a plurality of through holes formed corresponding to housing pocket 21a (see FIG. 2) of delivery drum 21. Similar to housing pocket 21a of delivery drum 21, the housing part 33 is formed in a horizontally long rectangular shape so that the axial direction of capsule 40, which is stored, is placed along the rotation axis direction of transport body 32. Transport body 32 houses capsule 40, which is transported from delivery drum 21 along guide plate 22 in a sideway state (or being laid down), in housing part 33 while maintaining the sideway state of the capsule, and transports to imaging position P along the outer peripheral surface of inner cylinder 31. It is preferred for the size of housing part 33 to be large enough such that a gap is formed between the inner wall of housing part 33 and the outer surface of capsule 40 so that capsule 40 can rotate inside the housing part 33. Particularly, with respect to the axial direction of capsule 40, it is preferable to secure a gap sufficient to determine the movement of capsule 40, which will be described later. The shape of housing part 33 is not particularly limited, and may be an oblong shape other than the rectangular shape, for example.

Inspection drum 30 is further provided with contact body 34 that rotates capsule 40 carried to imaging position P by contact friction. Contact body 34 is a roller that is rotationally driven regardless of transport body 32. Contact body 34 is placed such that the outer peripheral surface, which is formed smooth, is exposed to the outside of inner cylinder 31 (or the inside of housing part 33) through the window portion formed in inner cylinder 31.

The line sensor camera 17a included in the image pickup device 17 shown in FIG. 1 takes an image of capsule 40 carried to image pickup position P shown in FIG. 3 and outputs the image pickup data to determination device 20. Determination device 20 determines the quality of capsule 40 based on the imaging data, and controls the injection of compressed air from the injection nozzle (not shown) according to the determination result, whereby capsule 40 is selectively carried to either good product recovery chute 35 or defective product collection can 36.

Figure 4:
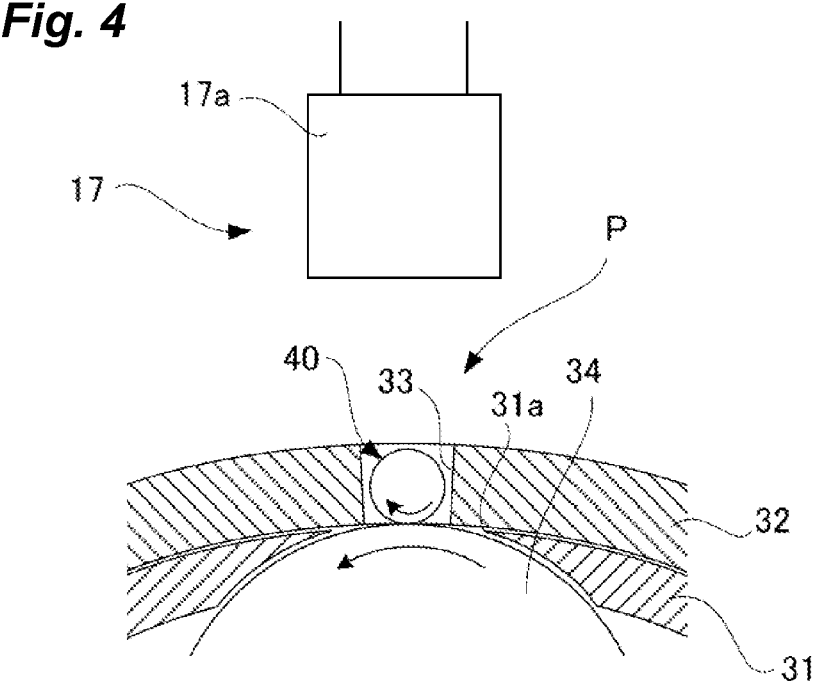
FIG. 4 is a view schematically showing a main part of FIG. 3.

As shown in a schematic diagram in FIG. 4, capsule 40 housed in housing part 33 is carried to imaging position P by the intermittent drive of transport body 32 and temporarily stops. Then, contact body 34 exposed through window part 31a of inner cylinder 31 rotates in the direction indicated by the arrow, so that contact friction occurs between contact body 34 and the lower portion of capsule 40, and capsule 40 rotates around the axis indicated with the arrow. Line sensor camera 17a captures the entire circumference of capsule 40 by imaging rotating capsule 40. When the imaging is completed, the driving of carrier 32 is restarted, and next capsule 40 is carried to imaging position P. In this way, the imaging data of capsules 40 that are sequentially carried can be individually acquired.

Figure 5A:
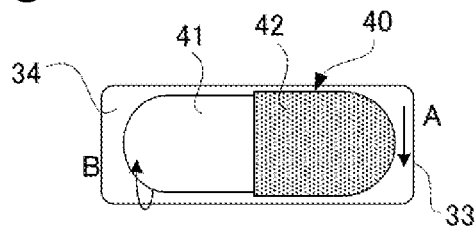
FIGS. 5A-5D are views for explaining an appearance inspection method for a capsule by the apparatus shown in FIG. 1.
Figure 5B:
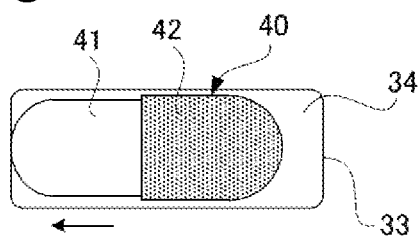

In the present embodiment, since the direction is not restricted before the capsule 40 is supplied to housing part 33, the orientation of capsule 40 housed in the housing part 33 is random. For example, as shown in FIG. 5A, when contact body 34 rotates in the direction of arrow A while capsule 40 is housed in housing part 33 so that body 41 is on the left side and cap 42 is on the right side. Body 41 and cap 42 come into contact with contact body 34, and capsule 40 rotates about the axial direction (around the fitting direction of body 41 and cap 42) as indicated by arrow B. Since the outer diameter of body 41 is smaller than the outer diameter of cap 42, rotating capsule 40 moves to the left side (the side of body 41) in housing part 33 as shown by the arrow in FIG. 5B.

Figure 5C:
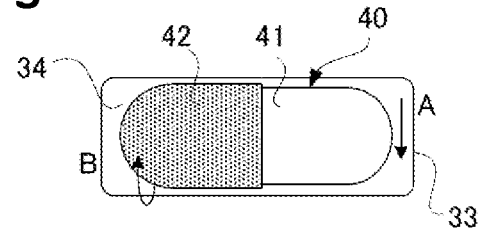
Figure 5D:
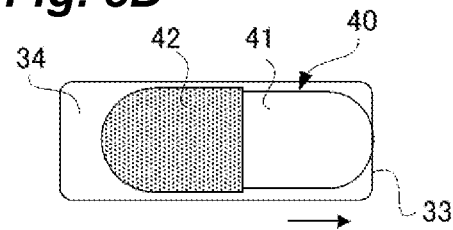

On the other hand, as shown in FIG. 5C, when the contact body 34 rotates in direction A indicated by arrow A while capsule 40 is housed in housing part 33 so that body 41 is on the right side and cap 42 is on the left side. Due to the rotation indicated by arrow B of capsule 40, capsule 40 moves to the right side (the side of body 41) in housing part 33 as shown by the arrow in FIG. 5D.

In this way, due to the difference in the outer diameters of body 41 and cap 42, rotating capsule 40 always moves to the side of body 41. Therefore, by imaging the entire circumference of capsule 40 after the movement, the orientation of the capsule 40 can be correctly determined based on the position of capsule 40 inside housing part 33. The cross-sectional shape of the portion where body 41 and cap 42 come into contact with contact body 34 is preferably a circular shape, but may be an elliptical shape, a polygonal shape, or the like. The outer peripheral surface of contact body 34 in contact with capsule 40 is preferably formed smooth so that it can reliably contact both body 41 and cap 42 regardless of the orientation of capsule 40. In order to ensure contact between capsule 40 and contact body 34, it is preferable to vacuum-suck the inside of inner cylinder 31 to suck capsule 40 toward contact body 34.

Figure 6A:
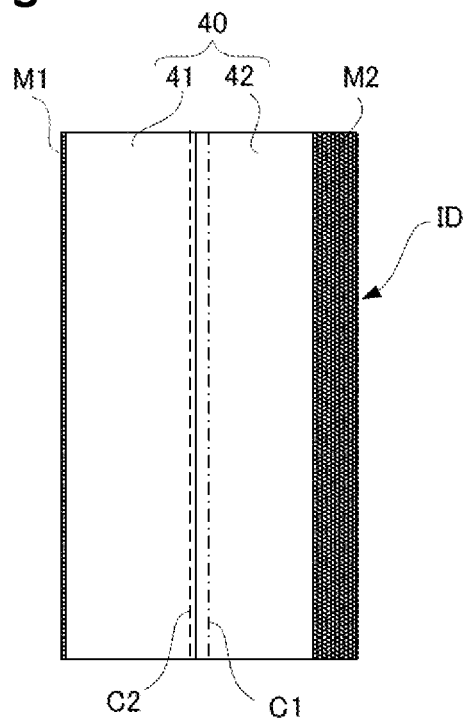
FIGS. 6A and 6B are views showing an example of imaging data.
Figure 6B:
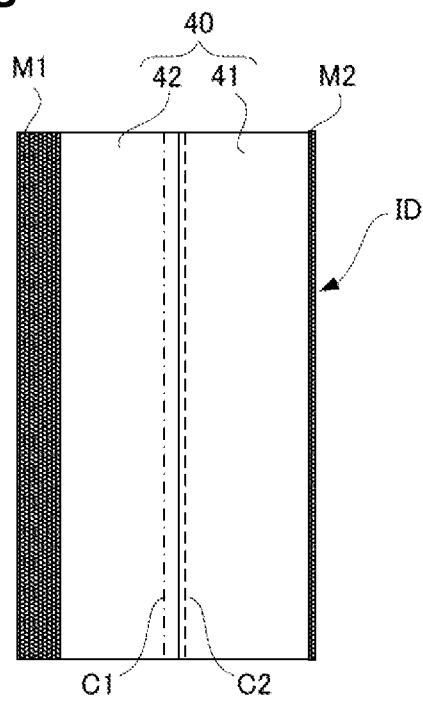

FIGS. 6A and 6B are diagrams showing an example of imaging data obtained by imaging the entire circumference of capsule 40. As shown in FIG. 6A, when capsule 40 is housed in housing part 33 (see FIG. 5A) so that body 41 is on the left side and cap 42 is on the right side, capsule 40 is on the left side, by capsule 40 moving to the left side, center line C2 (broken line) passing through the center in the axial direction (left-right direction in the figure) of capsule 40 becomes the left side with respect to center line C1 (single dot chain line) passing through the center of the imaging area. On the other hand, as shown in FIG. 6B, when capsule 40 is housed in housing part 33 (see FIG. 5C) so that body 41 is on the right side and cap 42 is on the left side, by capsule 40 moving to the right side, center line C2 (broken line) passing through the center of capsule 40 in the axial direction (left-right direction in the figure) becomes the right side with respect to center line C1 (single dot chain line) passing through the center of the imaging area. Since the center of the imaging area is always constant and the axial center of capsule 40 can be calculated by extracting the image of capsule 40 included in the image data, by comparing the positions of the center, the position of the capsules in housing part 33 can be accurately acknowledged, whereby the orientation of capsule 40 can be reliably determined.

The method for determining the orientation of capsule 40 is not limited to the above method. For example, instead of calculating the axial center of capsule 40, the boundary line between body 41 and cap 42 may be compared with the center line of the imaging area. It is also possible to determine the orientation of capsule 40 by comparing the sizes of margin portions M1 and M2 generated on the left and right sides of capsule 40 in the imaging data. Alternatively, sensors can be installed at both ends of housing part 33, and the position of capsule 40 in housing part 33 can be detected by these sensors to determine the moving direction of capsule 40. According to these methods, even when the colors of body 41 and cap 42 are the same or similar to each other, or when there is no printing on body 41 and cap 42, or when the printed contents are the same or similar, the orientation of capsule 40 can be accurately determined.

Determination device 20 determines the quality of the capsule contained in the image data based on the orientation of the determined capsule. For example, when the inspection conditions are set with the orientation of capsule 40 on which body 41 is on the left side, if the actual orientation of capsule 40 is determined the same as the orientation assumed by the inspection conditions, the inspection can be performed as it is. On the other hand, when the actual orientation of capsule 40 is opposite to the orientation assumed by the inspection conditions, the inspection is performed after the imaging data is flipped horizontally. Thereby, the inspection can be performed under the same inspection conditions regardless of the actual orientation of capsule 4

In the present embodiment, the transport method of capsule 40 by transport body 32 is a rotary transport type, but a linear transport type or the like may be used. Further, contact body 34 of the present embodiment is a roller that rotates capsule 40 by rotation, but it may be any type of configuration that rotates capsule 40 by a linear motion or a swing motion of a belt or a plate material, etc. that causes contact friction with capsule 40. The transport body 32 may be termed as a carrying body in the application.

EXPLANATION OF REFERENCES

1 Capsule appearance inspection apparatus
17 Imaging device
20 Determination device
30 Inspection drum
32 Carrying body
33 Housing part
34 Contact body
40 Capsule(s)
41 Body
42 Cap

What is claimed is:

1. An apparatus for inspecting an appearance of a capsule in which the capsule is composed at least of a cap and a body fitted to the cap, the cap having an outer diameter larger than the body having, comprising:
    a carrying body that carries the capsule housed in a housing part, wherein the housing part has an inner space surrounded by an inner wall of the housing part and extending in a longitudinal direction,
        of which a longitudinal length in the longitudinal direction is greater than an axis length of the capsule in an axis direction such that the capsule is able to shift forward and backward along the longitudinal direction, wherein the inner space of the housing part is divided into two sides along the longitudinal direction, and defined as a front side and a back side, and
        in which a gap is formed between the inner wall of the housing part and an outer surface of the capsule in a lateral direction of the housing part such that the capsule is able to rotate around an axis of the capsule,
    a contact body that is configured to rotate around an axis,
    an imaging device that is configured to take an image of the capsule contained inside the housing part, and
    a determination device that is configured to detect a location of the capsule in the inner space of the housing part based on an imaging data taken by and transmitted from the imaging device, wherein
    the housing part has
        an upper opening through which the capsule comes in and out of the housing part, and
        a window portion at a bottom of the housing part wherein the contact body is placed beneath the window portion such that an outer peripheral surface of the contact body is exposed to the inner space of the housing part to contact the outer surface of the capsule,
    the contact body is configured to rotate the capsule around the axis of the capsule in correspondence with a rotation of the contact body by using a contact friction force generated between the outer surface of the capsule and the outer peripheral surface of the contact body, causing the capsule to shift toward a side of the body due to a diameter difference between the cap and the body so that the capsule is positioned either in the front side or the back side, and
    the determination device determines whether the capsule is in the front side or the back side according to the detected location of the capsule based on the imaging data wherein a side in which the capsule is detected is defined as a shifted side, and further determines an orientation of the capsule as the body of the capsule is positioned in the shifted side and the cap of the capsule is positioned in the opposite side of the shifted side.

2. The apparatus according to claim 1, wherein the determination device determines the orientation of the capsule by comparing a center of the axis direction of the capsule contained in the imaging data with a center of an imaging area of the imaging device.

3. The apparatus according to claim 2, wherein the contact body is a roller of which the outer peripheral surface contacting the capsule is formed smooth.

4. The apparatus according to claim 1, wherein the contact body is a roller of which the outer peripheral surface contacting the capsule is formed smooth.

5. The apparatus according to claim 4, wherein
the carrying body has at least one axis around which the carrying body rotates to carry the capsule, and
the one axis of the carrying body is arranged parallel to an axis of the roller of the contact body.

6. The apparatus according to claim 1, wherein the determination device
calculates two marginal portions between the capsule and the inner wall of the housing part in the front side and the back side using the imaging data, and
determines whether the marginal portion of the front side or the marginal portion of the back side is smaller, and
determines the orientation of the capsule as the body of the capsule is positioned in a side with the smaller marginal portion.

7. The apparatus according to claim 1, wherein
the determination device stores inspection conditions in advance for determining whether the capsule is good or bad, wherein the inspection conditions are designed for a situation where the capsule is in a predetermined orientation,
when the orientation of the capsule matches the predetermined orientation, the determination device compares the inspection conditions with the imaging data as they are to determine whether the capsule is good or bad, and
when the orientation of the capsule does not match the predetermined orientation, the determination device reverses one of the inspection conditions and the imaging data and then compares them to determine whether the capsule is good or bad.

8. The apparatus according to claim 7, wherein
when the capsule is determined as good, the determination device is configured to continue to carry the capsule along a carrying path, and
when the capsule is determined as bad, the determination device is configured to remove the capsule from the carrying path.

* * * * *